Jan. 20, 1970     R. B. AHRABI     3,490,986
SELF-MOLDING PACKING
Filed March 7, 1967
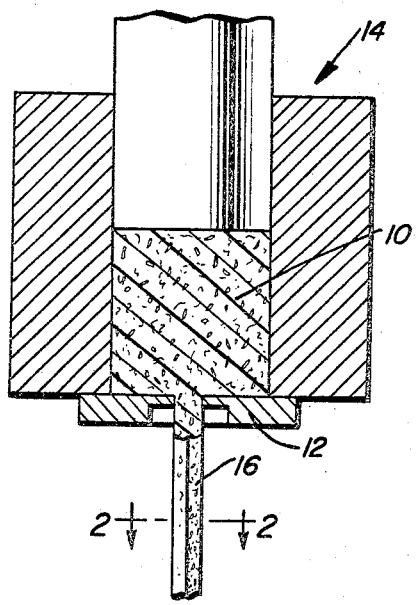
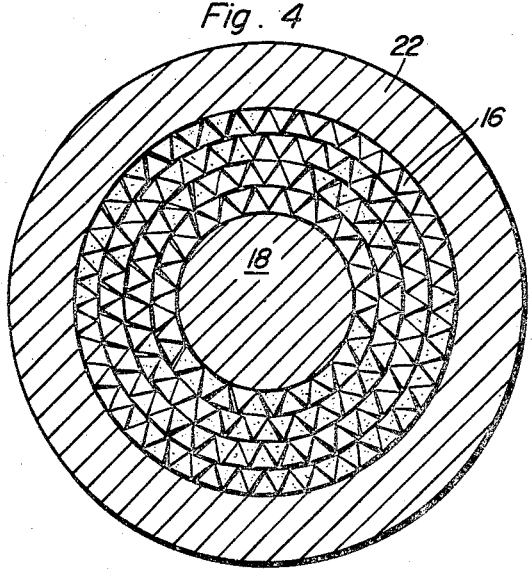
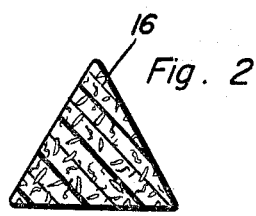
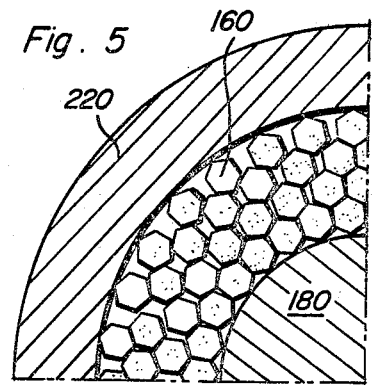
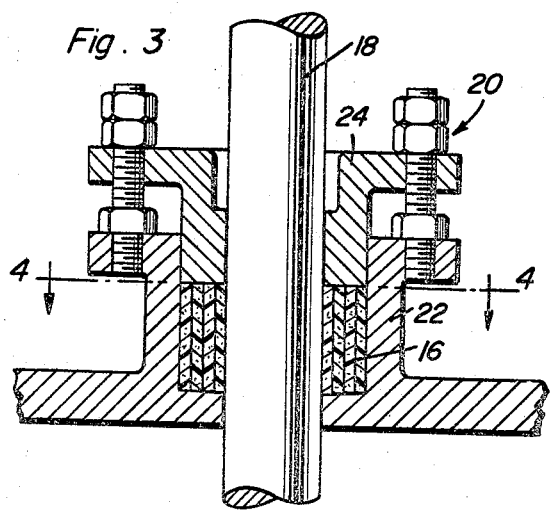
Robert B. Ahrabi
INVENTOR.
BY *Clarence A. O'Brien*
*and Harvey B. Jacobson*
Attorneys

United States Patent Office 3,490,986
Patented Jan. 20, 1970

3,490,986
SELF-MOLDING PACKING
Robert B. Ahrabi, Lafayette, La., assignor to Oil Center
 Research, Inc., a corporation of Louisiana
Filed Mar. 7, 1967, Ser. No. 621,299
Int. Cl. F16j 15/22
U.S. Cl. 161—174          4 Claims

ABSTRACT OF THE DISCLOSURE

Synthetic resinous semi-rigid packing of non-circular cross-sectional configuration comprising a mixture of particulate polytetrafluoroethylene and a bodied lubricant comprising an organophilic bentonite dispersed in grease whereby said packing, due to its shape and composition, is capable of autogeneously conforming to the configuration of the relatively stationary and moving surfaces within a stuffing box without being extruded past the packing gland of the stuffing box.

---

This invention relates generally to a packing composition and article to be utilized in stuffing boxes and the like for sealing rotary and reciprocating machine members. More particularly the present invention relates to a novel non-circular packing incorporating a significant proportion of particulate polytetrafluoroethylene.

Numerous composite packings and relatively solid lubricants have been proposed heretofore for utilization in stuffing boxes and the like in order to provide a sealing means between relatively movable members as, for example, a housing and a rotatable or reciprocating tube or shaft.

It has also been proposed heretofore to impregnate inorganic non-resinous fibrous gaskets and packings with dispersions of finely divided resins such as polytetrafluoroethylene, however, such packings are somewhat less than satisfactory under extreme pressure and temperature applications, such as may often be encountered in oil field machinery and the like for example, inasmuch as the inorganic fibrous base of such packings is generally not too cohesive thereby leading to premature failure of the packing thus precipitating a costly shut-down of the machinery when the packing failure occurs at a relatively critical point.

Furthermore, it is known to be old to form relatively rigid packing or seal members utilizing extrusion techniques involving the use of polytetrafluoroethylene in conjunction with organic extrusion aids. Following the extrusion of the parts, the extrusion aid is volatilized after which the part is subjected to a sufficient temperature to sinter the polytetrafluoroethylene. Moreover, it is also known to be old to preform relatively rigid packing and seal members from pressure coalesced virgin unsintered particulate polytetrafluoroethylene. Unfortunately, both of the latter types of polytetrafluoroethylene packings are characterized by a tendency to become age hardened, or substantially inflexible in use so as to severely limit their ability to conform to the housing and/or rotatable or reciprocating member to be sealed. More specifically, it will be appreciated that in the normal operation of a stuffing box, valve bonnet, and the like, it is customary from time to time to adjust the packing gland so as to compress the packing or seal member to insure continued contact of the packing or seal member with the housing and movable member therein. It will thus be appreciated that when the aforementioned substantially pure polytetrafluoroethylene packings or seal members become inflexible it is difficult if not impossible to properly compress the packing with the packing gland thereby severely limiting the effectiveness of the packing.

It is therefore an object of the present invention to provide a semi-rigid self-lubricating packing of non-circular cross-sectional configuration possessing a controlled degree of deformability so as to insure that the packing remains somewhat resilient in use for a period of time substantially longer than non-circular resinous packings proposed heretofore.

It is another object of the present invention to provide a semi-rigid self-lubricating packing composition and article possessing a controlled degree of deformability, or self-molding characteristics, so as to facilitate utilization of a standardized non-circular cross-sectional packing in numerous types and sizes of stuffing boxes, valve stem bonnets, and the like without necessitating the custom fabrication of seal members for each and every application.

A further object of the present invention is to provide a generally resinous semi-rigid packing composition and article characterized by a stick-like non-circular and preferably triangular or hexagonal cross-sectional configuration which packing is capable of autogeneously conforming to the configuration of the relatively stationary and moving surfaces to be sealed without being extruded past the packing gland of a stuffing box or the like during the adjustment thereof.

Still another object of the present invention is to provide a semi-rigid self-lubricating relatively non-extrudible packing composition and article comprising both virgin and sintered polytetrafluoroethylene and grease preferably bodied with a suitable bentonitic substance so as to provide a relatively rigid, extrudible packing composition which in use tends to maintain a significant degree of resiliency, without excessive flow of the resin, so as to significantly increase the useful life of such packing.

Still a further object of the present invention is to provide a semi-rigid self-lubricating packing preferably of triangular or hexagonal cross-sectional configuration extruded in indeterminate lengths which may be severed into appropriate lengths and placed in concentric courses in a stuffing box or the like, longitudinally disposed relative to the movable member therein, whereby the non-circular configuration of the packing facilitates filling the space between the relatively stationary housing and the movable member with a minimum of voids between the lengths of packing thus assuring maximum surface-to-surface contact of the packing with the surfaces to be sealed.

These together with other objects and advantages which will become subsequently apparent reside in the details of the composition and article as more fully hereinafter described and claimed, reference being had to the accompanying drawings forming a part hereof, wherein like numerals refer to like parts throughout, and in which:

FIGURE 1 is a diagrammatic view of a typical extruding device suitable for the extrusion of packing contemplated by the present invention;

FIGURE 2 is an enlarged cross-sectional view of an exemplary form of the extruded packing taken along the line 2—2 of FIGURE 1;

FIGURE 3 is a diagrammatic view of a typical stuffing box utilizing packing produced in accordance with this invention;

FIGURE 4 is an enlarged cross-sectional view of the stuffing box taken substantially along the plane of the line 4—4 of FIGURE 3 further showing the orientation of concentric courses of the elongated triangular packing; and FIGURE 5 is a fragmentary cross-sectional vew of a stuffing box utilizing packing produced in accordance with the present invention characterized by an exemplary form comprising a hexagonal cross-sectional configuration.

Briefly, the invention comprises compounding and extruding or otherwise die forming semi-rigid packings, of other than circular geometrically complementary cross-sectional configuration, which incorporate a major proportion of particulate polytetrafluoroethylene of both the sintered and unsintered type, proportionately blended so as to establish a preferred flow characteristic of the packing, together with minor proportion of lubricating grease or oil which has been bodied with a siliceous material such as bentonite or a bentonitic clay reacted with an aliphatic amine salt so as to improve the extrusion properties of the packing composition as well as insuring that in use the packing composition does not tend to become substantially inflexible through the mechanism of sintering or the like.

As indicated hereinabove one form of the particulate polytetrafluoroethylene utilized is the virgin unsintered type wherein the polymer has not been heated to above a gelling temperature of approximately 700° to 800° F., which is considered to be an approximate sintering temperature, and thus is still characterized by an ability to flow to a reasonable, although not excessive, degree under pressure. While this well-known flow characteristic of virgin polytetrafluoroethylene is often thought to be a disadvantage it will become apparent hereinafter that this very property of the virgin polytetrafluoroethylene is used to advantage in the present invention to control and maintain the desired deformability of the packing produced in accordance with this invention.

A virgin form of polytetrafluoroethylene suitable for the practice of the present invention is manufactured by the E. I. du Pont Co. under the trademark of Teflon and further designated as Teflon 1, Teflon 5 and Teflon 7, for example, which comprise granulated or powdered polytetrafluoroethylene ranging in size from micron size to approximately 30–40 mesh Tyler standard such as conventionally utilized for the molding of solid polytetrafluoroethylene articles. Polytetrafluoroethylene particles of this nature require no further processing prior to incorporation in the packings proposed herein.

The other form of polytetrafluoroethylene utilized herein is sintered and is generally recovered from the machining of sintered and unsintered polytetrafluoroethylene articles. Such waste material, which is normally in the form of relatively thin shavings, is prepared for utilization in the composition and article set forth herein by subjecting thin layers of the material to high compressive forces such as by rolling between counter rotating rolls exerting a pressure in the order of 20,000 lbs. per square inch, for example, after which the compressed polytetrafluoroethylene is subjected to a temperature in the order of approximately 700–800° F. so as to sinter the polytetrafluoroethylene thereby substantially reducing the cold flow characteristics of the resin. The sintered polytetrafluoroethylene is then comminuted to a particle size of approximately 4–100 mesh Tyler Standard in a siutable apparatus such as a hammer mill, for example. It will further be understood that the sintered material utilized herein need not necessarily be derived from machine shop scraps or waste but could be prepared in the manner described hereinabove from virgin polytetrafluoroethylene.

It will further be understood that the particular range of mesh size of the polytetrafluoroethylene is merely exemplary since the polytetrafluoroethylene particle size is limited only by the practical aspects of its application i.e. the clearance between the relatively stationary and movable members of the stuffing box or the like.

As indicated heretofore the suitable minor proportion of the grease or lubricating oil which has been significantly thickened by the incorporation of a siliceous material is incorporated with the virgin and sintered particulate polytetrafluoroethylene so as to both improve the extrusion properties thereof and more importantly assure that the packing material does not become autogeneously sintered in use thus rendering it ineffective for the purpose intended.

Toward this end, the greases preferred for use in this invention are those which are stable when heated above their melting point and cooled again, and are water resistant. One of many such suitable greases is "Lubriplate 930–AA" which is the Fiske Bros. Refining Co. trademark for a lithium grease using lithium salts of the higher fatty acids or lithium soaps of fatty glycerides, such as lithium stearate, for example. However, it will be understood that any extreme-pressure, high-film-strength grease or oil which may be bodied with a bentonite or the like, is suitable for the practice of the present invention.

The silicious material utilized to body up the grease is preferably an organophilic bentonite obtained by reacting a bentonitic clay with an aliphatic amine salt. These organophilic bentonites are well known and one commercial example is "Bentone 34" which is the National Lead Co. trademark for dimethyldioctadecyl ammonium bentonite.

A typical self-molding packing composition article produced in accordance with the present invention comprises, on the basis of weight, approximately 3–95% virgin unsintered polytetrafluoroethylene, 5–95% sintered polytetrafluoroethylene, 1–25% siliceous gelling or thickening agent such as Bentone 34, and 1–50% of a grease such as Lubriplate 930–AA.

While it is not intended to be restricted by this analysis, it is believed that a minor proportion of high-pressure, high-film-strength grease, preferably bodied with a siliceous material, precludes the autogeneous sintering, or age hardening in use, of packing compounded and extruded in accordance with the present invention.

The following examples are incorporated herein to specifically illustrate the practice of the present invention to provide non-circular cross-sectional semi-rigid self-lubricating packing compositions and articles possessing a controlled degree of deformability.

EXAMPLE I

A resinous semi-rigid packing of triangular cross-sectional configuration was produced from a composition utilizing:

| | Percent |
|---|---|
| Particulate virgin polytetrafluoroethylene (fines up to about 40 mesh Tyler) | 20 |
| Particulate sintered polytetrafluoroethylene (from about 4–100 mesh Tyler) | 60 |
| Bentone 34 | 5 |
| Lubriplate 930–AA | 15 |

The above components were intimately admixed to form a highly viscous semi-rigid packing composition indicated at 10 which was extruded through a die 12 having a triangular, hexagonal or other suitable generally regular geometrical shape opening therein which die is a part of a conventional extrusion device diagrammatically indicated at 14. The resinous semi-rigid triangular packing 16 is extruded in indefinite lengths.

As indicated by FIGURE 2 the particulate virgin unsintered and sintered polytetrafluoroethylene particles form a "fibrous" network produced by the relatively high extrusion pressures which fibrous network extends substantially throughout the packing 16 with the interstices within the fibrous network being occupied by the bodied grease. As seen in FIGURES 3 and 4 a plurality of short lengths of the packing 16 have been placed concentrically about a relatively movable member 18 which passes through a relatively stationary member 22 or housing of a stuffing box indicated generally at 20. Furthermore, it will be noted that the short lengths of the packing 16 are disposed longitudinally with respect to the movable member 18 and are compressed into sealing engagement with both the member 18 and the stationary portion or housing 22 of the stuffing box 20 by means of an adjustable packing gland or neck ring 24.

It will be appreciated from FIGURE 4 that the non-circular and preferably triangular, configuration of the packing 16 facilitates substantially filling the space between the relatively movable member 18 and the relatively stationary member 22 so as to substantially eliminate voids therebetween upon tightening of the packing gland 24. It will further be appreciated that the resinous semi-rigid packing provided herein has a limited amount of deformability so as to limit the amount of cold flow to establish a proper seal without permitting outward extrusion of the packing 16 from the stuffing box 20.

EXAMPLE II

A packing composition was again compounded as set forth in Example I, however, the intimately admixed composition 10 was extruded in indefinite lengths having a hexagonal cross-sectional configuration as seen in FIGURE 5 wherein such packing designated by the numeral 160 is shown longitudinally disposed within a sutffing box between a relatively movable member 180 and a relatively stationary member 220 in a manner analogous to that discussed with regard to the packing of the stuffing box 20. As with the composition and article set forth in Example I the packing 160 was found to be highly satisfactory for packing stuffing boxes and the like and is characterized by ability to deform to a limited extent to effect a proper sail without being extruded from the stuffing box or the like. Moreover, as indicated with respect to the brief discussion of the theory hereinbefore it is found that the body grease incorporated in the packing 160, as well as 16, maintained the deformability of the packing over a prolonged period thus assuring that adjustment of the packing gland 24 could be effected as required.

Accordingly, it may be seen that there has been provided a resinous semi-rigid packing composition of non-circular cross-sectional configuration which is superior to resinous shaped packings proposed heretofore. Moreover, it will be seen that the composition set forth herein meets the physical parameters set forth for a resinous semi-rigid packing which must maintain a limited degree of deformability over a considerable period of time so as to substantially increase the useful life of the packing.

Moreover, it will be seen that the non-circular configuration of the packing set forth herein facilitates the packing of stuffing boxes and the like of varying dimensions and configurations by utilizing appropriate lengths of packing severed from an indefinite length of the packing material so as to substantially preclude the necessity of custom molded packing rings, or the like, for each and every application contemplated.

The foregoing is considered as illustrative only of the principles of the invention and accordingly all suitable modifications and equivalents may be resorted to, falling within the scope of the invention as claimed.

What is claimed as new is as follows:

1. A length of resinous semi-rigid packing of non-circular cross-sectional configuration comprising on the basis of weight approximately 20% particulate virgin unsintered polytetrafluoroethylene, approximately 60% particulate sintered polytetrafluoroethylene, approximately 5% dimethyldioctadecyl ammonium bentonite and approximately 15% of an extreme-pressure, high-film strength grease.

2. The combination of claim 1 wherein said packing is of a triangular cross-sectional configuration.

3. The combination of claim 1 wherein said packing is of a hexagonal cross-sectional configuration.

4. A length of resinous semi-rigid packing of triangular cross-sectional configuration consisting essentially of, on the basis of weight, approximately 3–95% particulate virgin polytetrafluoroethylene of approximately micron to 40 mesh Tyler, approximately 5–95% particulate sintered polytetrafluoroethylene of 100–4 mesh Tyler, approximately 1–25% organophlic bentonite, and approximately 1–50% high-pressure, high-film-strength grease.

References Cited

UNITED STATES PATENTS

| | | | |
|---|---|---|---|
| 945,039 | 1/1910 | Katzenstein | 161—175 X |
| 2,151,096 | 3/1939 | Freedlander | 161—177 X |
| 2,578,523 | 12/1951 | Llewellyn | 277—237 X |
| 2,782,179 | 2/1957 | Lontz. | |
| 2,891,921 | 6/1959 | Kumnick et al. | |
| 2,930,106 | 3/1960 | Wrotnowski et al. | 161—189 X |
| 2,951,721 | 9/1960 | Asp. | |
| 2,998,397 | 8/1961 | Riesing. | |
| 3,097,990 | 7/1963 | Holly. | |
| 3,223,676 | 12/1965 | Rucker. | |
| 3,291,496 | 12/1966 | Wiltse | 277—171 X |

FOREIGN PATENTS 1,419,195   10/1965   France.

ROBERT F. BURNETT, Primary Examiner

W. W. SCHWARZE, Assistant Examiner

U.S. Cl. X.R.

161—177, 189; 277—105, 198, 237